J. W. CORWIN.
Potato Digger.
No. 86,509.
2 Sheets—Sheet 1.
Patented Feb. 2, 1869.
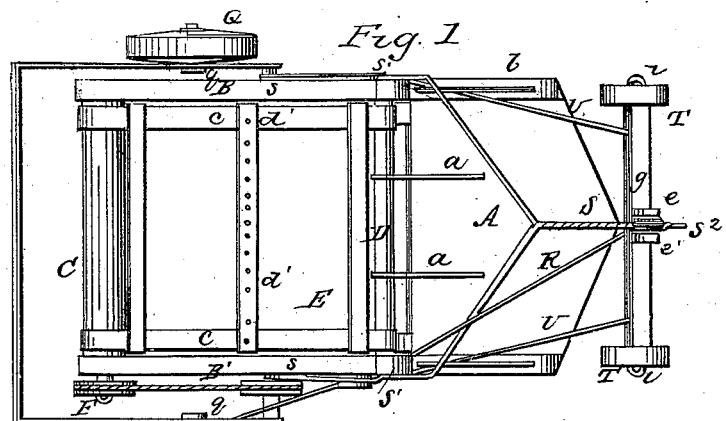
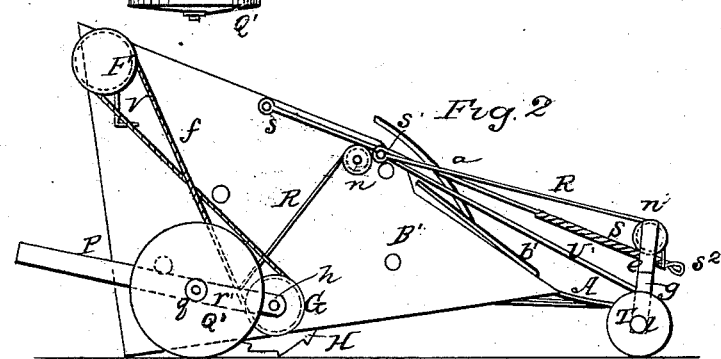
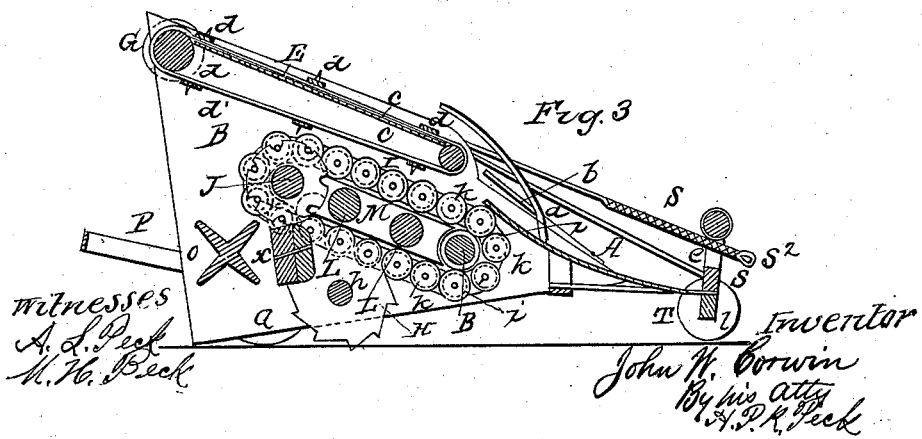

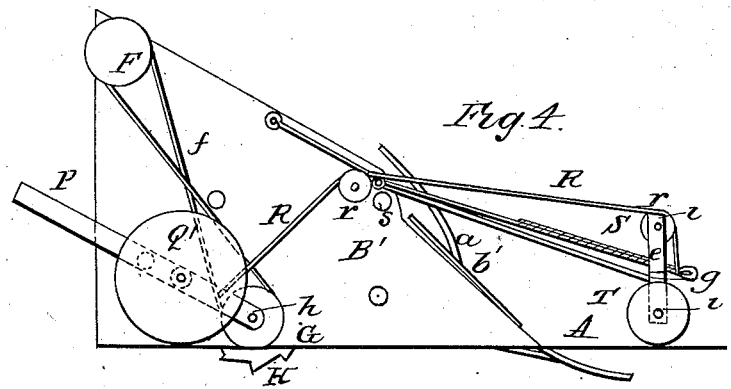
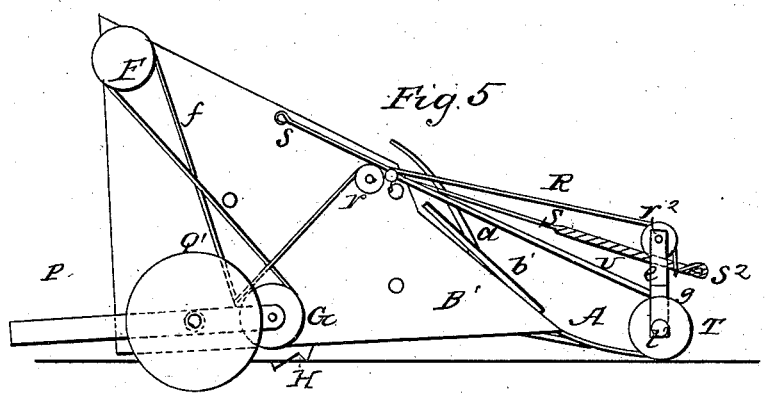

JOHN W. CORWIN, OF LEBANON, OHIO.

Letters Patent No. 86,509, dated February 2, 1869.

IMPROVEMENT IN POTATO-DIGGER.

The Schedule referred to in these Letters Patent and making part of the same.

*To all whom it may concern:*

Be it known that I, JOHN W. CORWIN, of Lebanon, in Warren county, Ohio, have invented a new and useful Improvement in Machines for Digging Potatoes; and I do hereby declare that the following is a full and exact description thereof, reference being had to the accompanying drawings, and to the letters of reference marked thereon—

Figure 1 represents a top view of my machine.

Figure 2 is a side elevation of my machine, when mounted for moving it to the field.

Figure 3 is a vertical longitudinal section of the same.

Figure 4 represents the position of the machine when at work.

Figure 5 shows the adjustment of the plow or shovel above the ground.

The nature of my invention consists in the combination of a nearly flat two-sided plow, and separating-rods, with two endless carriers.

The plow elevates the potatoes, with the weeds and vines, and a mass of earth, which are separated by the arrangement of mechanism as hereinafter described.

The plow A is fastened between the two frame-pieces B B', and it has a number of rods, $a\ a$, fastened to it.

These rods are nearly parallel to each other, and incline rearward, so as to overhang the front end of the upper endless carrier, consisting of two or more belts, $c\ c$, which embrace two rollers, C D, and carry a number of slats $d'$, which may be armed with teeth $d$.

Two rods, $b\ b'$, for a like purpose as rods $a$, are fastened to the frame-pieces B B'.

The driving-roller C receives motion through a pulley, F, fastened to its journal, and outside of the frame, and a cord, $f$, which is moved by a pulley, G, on shaft $h$.

There is a floor, E, made of either wood or sheet-metal, around which the upper endless carrier travels. This floor E serves to support the apron, with its load of weeds, vines, or grass, which may be conveyed upon it by the guide-rods $a\ a$.

The shaft $h$ has two spurred travelling-wheels fastened to it, one of which is seen in section at H. fig. 3, The function of these travelling-wheels H is to carry the body of the machine, and to gear into or upon the connecting cross-rods, $i$, of a pair of endless chains, which constitutes the lower carrier.

I denotes one of these chains, seen in fig. 3.

The cross-rods serve as rivets to connect the links which form the chains.

Each end of all of the rods $i$ is provided with a supporting-roller, $k$.

These supporting-rollers are a part of the endless carrier, and they embrace two bearing-rolls, J K, which have their bearings in the frame-pieces B B'.

The upper part of this endless-grate carrier is supported by two boards, M, fastened to the inside of the frame-pieces B B', and between the two rolls J K, so as to allow the small rolls or wheels $k$ to travel upon them, and the lower edges of said boards serve as a counter-bearing, against which the rolls $k$ will be pressed, by the action of spur-wheels H, and thereby the spurs of these wheels H are kept in gear with rods $i$, to cause the endless-grate carrier to rotate.

There are two cross-bars, or beams, L L, and a third one, N, which hold the frame B B' firmly, and serve to strengthen the machine.

Below and in rear of the endless-grate carrier there is a bucket-wheel, O, in which the potatoes are collected as they fall down from the rear end of the revolving grate-carrier, and as a certain quantity is collected, the gravity of them will cause the wheel O to turn, and the potatoes will be dropped in a heap upon the ground.

A frame, P, swings upon the shaft $h$, and supports two wheels, Q Q'.

When this frame is pressed down, it will act as a lever, with its fulcrum on the short axles $q$ of wheels Q Q', and thereby raise the shaft $h$, and with it the rear portion of the machine, and cause its weight to rest upon wheels Q Q'.

The front part of the machine will at the same time be raised up with the plow A, by a cord, R, fastened to the frame P at $r$, the rope passing over $r^1\ r^2$ to the end of the tension or draught-rod S.

Thus, when the frame P is depressed, the cord, or rope R will pull the tension-rod up, and the tension-rod branches off, and is fastened by its branches to the outside of the frame-pieces B B' at $s\ s'$, in a suitable manner.

The bolster $g$ is held in its proper relation to the machine by the two brace-rods, U U'.

The machine will be propelled by the connection of a team with the end of the draught or tension-rod S.

The front axle-tree $l$ is supported upon the two wheels, T T'.

Two upright posts, $e\ e'$, support the roller $r^2$ between them, upon an axle-pin, and these posts form the vertical guides for the tension-rod S.

In fig. 4, the machine is represented as it appears when in operation.

The sides or frame B B' move along the line of the ground, while the plow moves beneath its surface to scoop up the potatoes, with earth, &c.

The wheels H revolve by friction upon the ground.

The frame P is supported by wheels Q Q' upon the ground, or it may be raised and held by the hook V.

In fig. 5, the frame P is depressed, thus lifting, by its leverage, the back part of the machine, and, by the action of the cord R, the front part of the body of the machine is raised up with the plow A.

By making the cord R more or less taut, the lifting action can be varied, so as to enable the operator to raise the back part of the machine to a certain extent before the cord R will commence lifting the forward part, whereby the plow can be caused to run into the ground to a greater or less extent, as the circumstances may require.

In fig. 2 the point of the plow A is elevated as high as axle-tree $l$, and the back part of the machine rests upon wheels Q Q', the frame P being held down for the purpose.

This is the proper manner to adjust the machine to move it to the field for operation.

When the machine is to be turned around, the operator will depress the frame P to elevate the plow, so as to require less power for this purpose.

As the machine progresses in the performance of its work, the plow enters the ground, and scoops up the earth, potatoes, vines, weeds, &c., which are forced up the plow until they reach the guide-rods $a\ a$; then the vines, weeds, &c., which form a sort of rude mat, are compelled to separate, and slide along upon the guide-rods until they are caught upon the slats $d'$, (and, when necessary, pins $d$ will be used,) and are taken back by the endless apron, which traverses over the floor E, and discharged behind the machine.

The potatoes and broken soil will, by their weight, separate themselves from the vines, weeds, &c., as the latter pass up the guide-rods $a\ a$, and will be thrust backward upon the endless grate, composed mainly of the cross-rods $i\ i$, and the agitation of the moving grate-carrier will sift the earth from the potatoes, the former falling through the carrier to the ground, while the potatoes will be conveyed rearward, and fall into one of the divisions of the bucket-wheel O.

When a certain weight of potatoes accumulates in the bucket, a partial revolution may be given to it, which will discharge its contents upon the ground.

A spring, $x$, may be employed as a stop to prevent the bucket-wheel from rotating until an amount of potatoes accumulates of sufficient weight to overcome its resistance, when the gravity of its contents will cause an automatic movement upon its axis of one-quarter revolution, which will discharge the potatoes upon the ground, and at the same time the next wing of the wheel will come in contact with the stop spring, and retain the bucket in position to receive a similar load, and again discharge itself in like manner.

Having fully described my invention, and the operation thereof, I desire to claim as my invention—

1. The two endless carriers and guide-rods $a\ a$, in combination with plow A and wheels H, constructed, arranged, and operating conjointly in the manner and for the purpose substantially as described.

2. The combination of frame P and wheels Q Q', with axle $h$, pulleys $r^1\ r^2$, tension-rod S, uprights $e\ e'$, and cord R, or their mechanical equivalents, for raising and adjusting the machine, in the manner and for the purpose substantially as described.

JOHN W. CORWIN.

Witnesses:
H. P. K. PECK,
M. KEEN.